(12) United States Patent
Iwaki

(10) Patent No.: US 8,861,878 B2
(45) Date of Patent: Oct. 14, 2014

(54) IMAGE PROCESSING METHOD AND DEVICE FOR PERFORMING GRAYSCALE CONVERSION, AND IMAGE PROCESSING PROGRAM

(75) Inventor: Yasuharu Iwaki, Tokyo (JP)

(73) Assignee: Fujifilm Corporation, Tokyo (JP)

(*) Notice: Subject to any disclaimer, the term of this patent is extended or adjusted under 35 U.S.C. 154(b) by 30 days.

(21) Appl. No.: 13/636,917

(22) PCT Filed: Mar. 23, 2011

(86) PCT No.: PCT/JP2011/057049
§ 371 (c)(1),
(2), (4) Date: Sep. 24, 2012

(87) PCT Pub. No.: WO2011/118662
PCT Pub. Date: Sep. 29, 2011

(65) Prior Publication Data
US 2013/0016901 A1 Jan. 17, 2013

(30) Foreign Application Priority Data
Mar. 23, 2010 (JP) .................................. 2010-066965

(51) Int. Cl.
*G06K 9/36* (2006.01)
*G06K 9/00* (2006.01)
(Continued)

(52) U.S. Cl.
CPC ............. *H04N 1/407* (2013.01); *H04N 1/4072* (2013.01); *H04N 9/67* (2013.01); *H04N 1/40012* (2013.01); *H04N 9/68* (2013.01); *H04N 1/6027* (2013.01)
USPC .......................................... 382/237; 382/162

(58) Field of Classification Search
USPC ................ 382/162, 164, 165, 167, 173, 237; 358/1.9, 3.03, 3.26, 515, 518, 523, 358/525, 530; 345/426, 589, 593, 611
See application file for complete search history.

(56) References Cited

U.S. PATENT DOCUMENTS 5,296,920 A 3/1994 Sakaue et al.
6,356,654 B1 * 3/2002 Loce et al. ..................... 382/162
(Continued)

FOREIGN PATENT DOCUMENTS

| EP | 1959681 | 8/2008 |
|---|---|---|
| JP | 2699711 | 1/1998 |
| JP | 2008-294969 | 12/2008 |

OTHER PUBLICATIONS

International Preliminary Report on Patentability—PCT/JP2011/057049—Oct. 26, 2012.
(Continued)

*Primary Examiner* — Amir Alavi
(74) *Attorney, Agent, or Firm* — Young & Thompson

(57) ABSTRACT

Disclosed are an image processing method and device and an image processing program that are able to perform gradation conversion—that achieves a favorable saturation reproduction when exchanging and reproducing images between devices or between color spaces having different dynamic ranges—by element of having: a first gradation conversion that, when converting gradation characteristics of image data of an image, converts first gradation characteristics using a one-dimensional first lookup table corresponding to the RGB pixel data of the image; and a second gradation conversion that converts the RGB pixel data of the image to chromaticity data and luminescence data or lightness data, and that converts second gradation characteristics of the converted luminescence data or lightness data using a one-dimensional second lookup table corresponding to the luminescence data or lightness data; and then weighting the first gradation conversion and the second gradation conversion.

13 Claims, 9 Drawing Sheets

(51) Int. Cl.
*H04N 1/407* (2006.01)
*H04N 9/67* (2006.01)
*H04N 1/40* (2006.01)
*H04N 9/68* (2006.01)
*H04N 1/60* (2006.01)
*G06K 9/46* (2006.01)

(56) References Cited

U.S. PATENT DOCUMENTS

| | | | | |
|---|---|---|---|---|
| 6,728,398 B1 * | 4/2004 | Hondl | ......................... | 382/162 |
| 7,466,450 B2 * | 12/2008 | Matsuzaki | ..................... | 358/1.9 |
| 7,706,606 B1 * | 4/2010 | Ruzon et al. | ................... | 382/162 |
| 8,164,793 B2 * | 4/2012 | Fujita et al. | .................... | 358/1.9 |
| 2013/0016901 A1 * | 1/2013 | Iwaki | ........................... | 382/162 |

OTHER PUBLICATIONS

Extended European Search Report dated Jul. 23, 2013; Application No. 11759467.1.

International Search Report, PCT/JP2011/057049, Apr. 26, 2011.

* cited by examiner

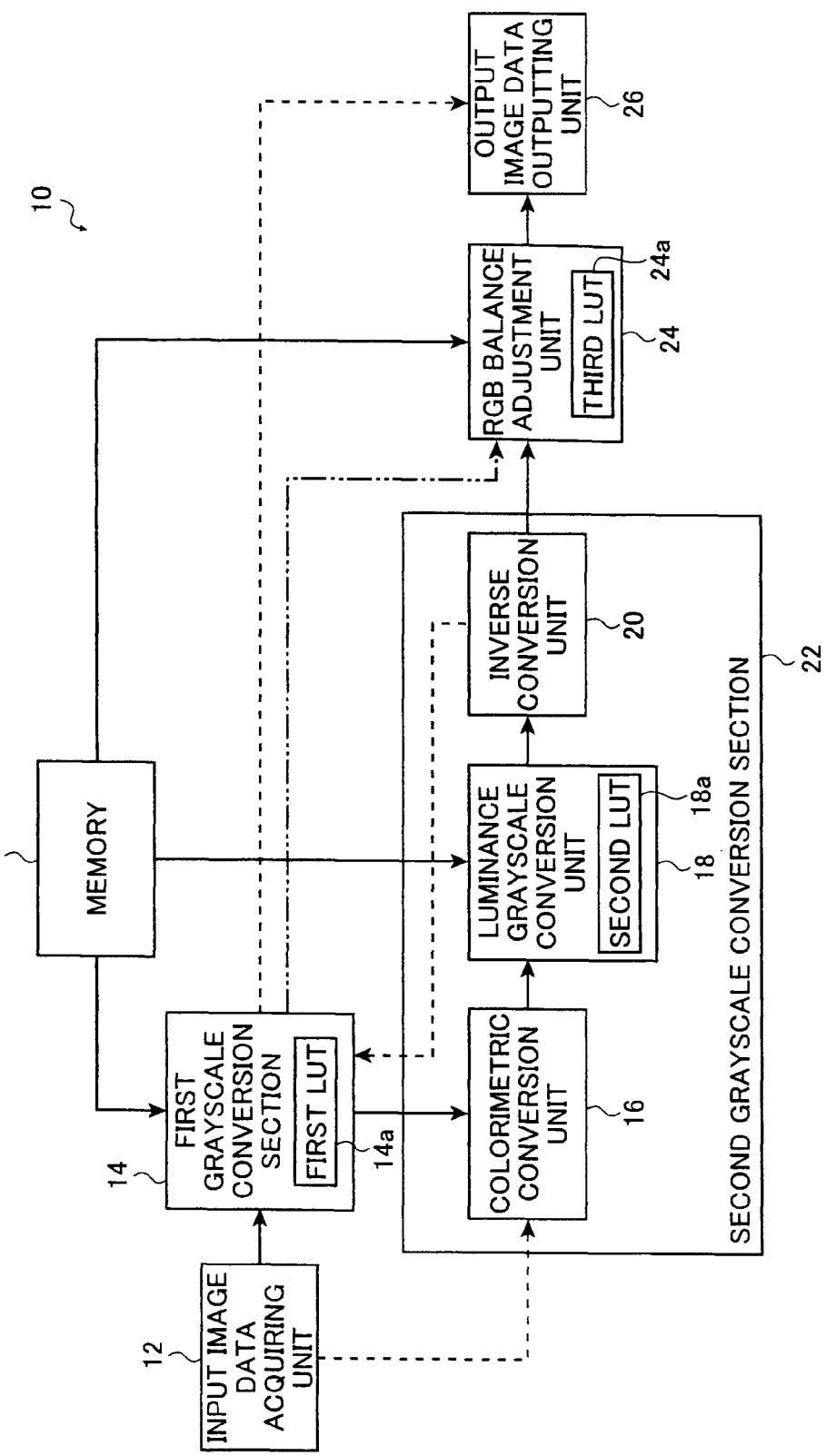

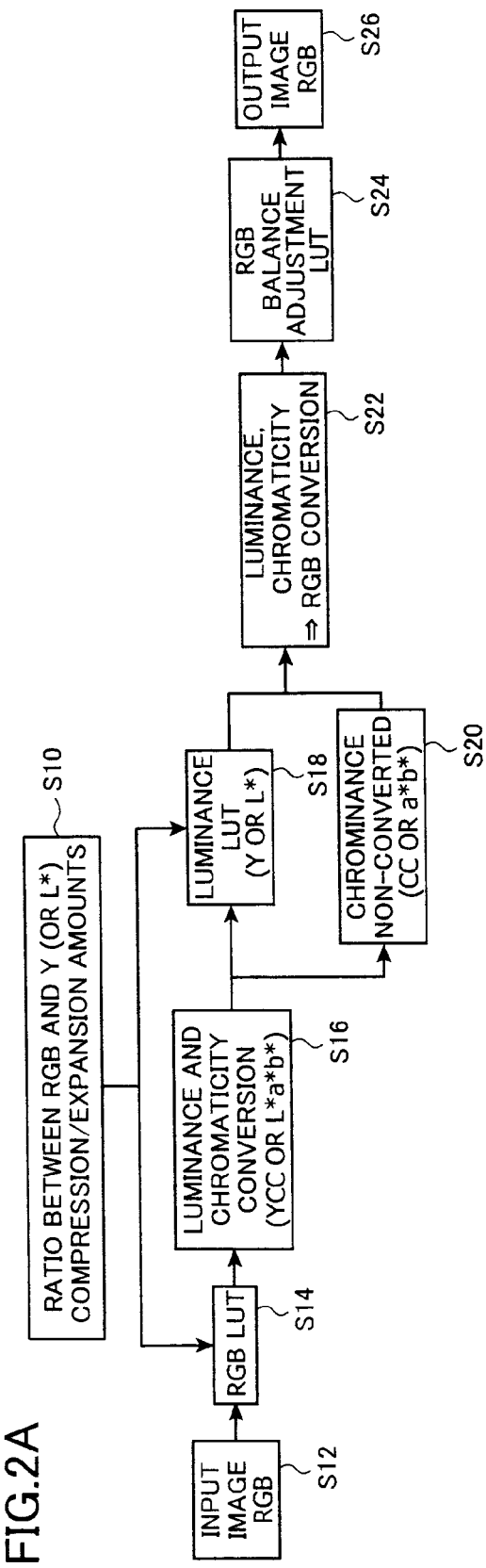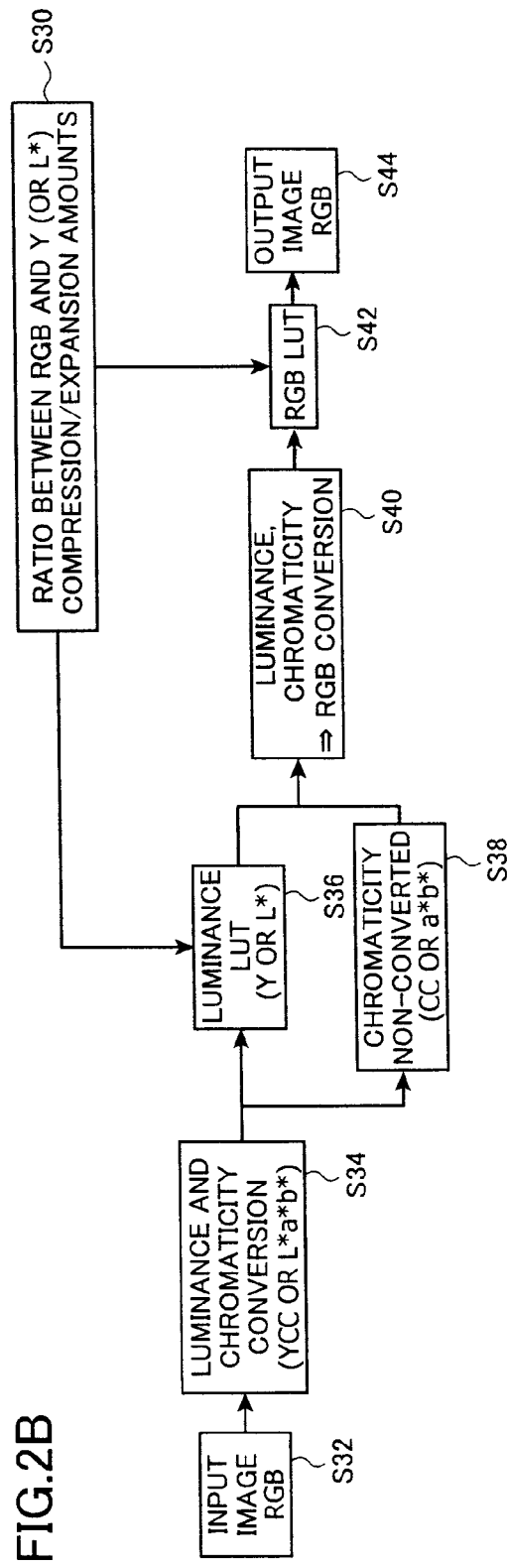

COLOR CHART

US 8,861,878 B2

IMAGE PROCESSING METHOD AND DEVICE FOR PERFORMING GRAYSCALE CONVERSION, AND IMAGE PROCESSING PROGRAM

This application is a 371 of PCT/JP2011/057049 filed on Mar. 23, 2011.

TECHNICAL FIELD

The present invention relates to image processing methods and devices, as well as image processing programs and media for recording such programs. Particularly, the present invention is drawn to image processing methods and devices which are able to suppress adverse effects of the change in saturation during the grayscale conversion of a color image, and exert control so that the saturation may favorably be reproduced even with a converted grayscale, as well as image processing programs for making a computer implement such image processing methods and computer-readable recording media with such programs stored therein.

BACKGROUND ART

When an image taken with a camera or produced with a personal computer as an input image is to be outputted from a printer as a hard copy image or displayed on a monitor as a soft copy image, for instance, the color space of the input image (input color space) is converted into the color space of the output device such as a printer or a monitor (output color space).

If the input color space and the output color space are different in dynamic range from each other, the grayscale is compressed or expanded to thereby map the image so that the dynamic range of the output device may effectively be used.

In the case where the output color space is smaller than the input color space, the grayscale needs to be subjected to conversion for compressing it in order to put the whole scene luminance information on the input image within a limited dynamic range for luminance of the output device.

Compression of the grayscale is normally performed using a one-dimensional lookup table (LUT) for converting a three-channel input image signal, with the three channels being red (R), green (G) and blue (B) channels, into a three-channel RGB output image signal.

FIG. 11 shows an exemplary grayscale curve used for an LUT for performing such compression of the grayscale.

The grayscale curve as shown is adapted for the compression of an RGB input image signal with a dynamic range of 5.3 into an RGB output image signal with a dynamic range of 3.3, and has a linear middle part with a slope of 45 degrees continuing at its both ends into parts with reduced slopes, respectively, that is to say, constitutes a so-called S curve.

The grayscale curve of S shape is used to maintain the grayscale at its middle levels while compressing it at lower and higher levels more intensively and, consequently, allows luminance information on an input image to be put within the dynamic range for luminance of an output image with no clamping thereof.

In another method for grayscale compression, an RGB signal is converted into a luminance signal and a chromaticity signal (in Yxy, YCC or L*a*b*, for instance), and the luminance signal Y or lightness signal L* is solely compressed using a grayscale curve (LUT).

Patent Literature 1 proposes yet another method for grayscale compression. In the gradation correcting method as disclosed in Patent Literature 1, a luminance signal is obtained from R, G, and B input signals; the luminance signal is gamma-converted according to desired gradation characteristics; the ratio of the gamma-converted luminance signal to the luminance signal before gamma conversion is multiplied by each of the R, G, and B input signals for obtaining primary gradation-corrected R, G, and B signals; the difference between each of the R, G, and B input signals and the luminance signal before gamma conversion is added to the gamma converted luminance signal for obtaining secondary gradation-corrected R, G, and B signals; and final, gradation-corrected R, G, and B output signals are obtained by interpolation from the primary and secondary gradation-corrected R, G, and B signals, with the ratio between the two types of gradation-corrected R, G, and B signals to be added being controlled depending on the value of the luminance signal before gamma conversion.

It is stated in Patent Literature 1 that the disclosed method is the gradation adjusting method which allows an effective brightness adjustment in the dynamic range of a CRT or a printer with no change in hue or saturation.

CITATION LIST

Patent Literature

Patent Literature 1: JP 2699711 B

SUMMARY OF INVENTION

Technical Problems

If the grayscale is compressed by a method using the above LUT for three-channel RGB image signals, a problem is raised in that the saturation is simultaneously changed. During the compression using such an S-shaped grayscale curve as shown in FIG. 11, lighter as well as darker colors are reduced in saturation with disadvantage.

In other words, during the compression or expansion of the grayscale, change in gray level brings about not only change in luminosity (or brightness) but in color reproduction, that is to say, in hue and saturation, so that the color as represented by the input image data appears differently upon output.

On the other hand, in the method which converts an RGB signal into a luminance signal and a chromaticity signal, and only compresses the luminance signal Y or lightness signal L*, the reproduced color feels uncomfortable because the saturation is kept intact.

In the gradation correcting method as disclosed in Patent Literature 1, the hue and the saturation are maintained by maintaining the difference between each of the R, G and B values, which are in a linear relationship to the luminance, and Y. Since human color perception is not necessarily linear to the luminance, the hue or the saturation may be changed with the greatly changed R, G, B or Y value, or depending on the position of the chromaticity point of any primary color, R, G or B (as defined by X, Y, and Z).

An object of the present invention is to solve the above problems with the prior art, aiming at providing an image processing method and an image processing device, each capable of maintaining the saturation and the hue of a color, or controlling the saturation at will, when the gray level is changed during the exchange and reproduction of images between color spaces or devices with different dynamic ranges and, accordingly, capable of performing the grayscale conversion which realizes a favorable saturation reproduction, as well as an image processing program for making a computer implement such an image processing method, and a computer-readable recording medium having such a program stored therein.

Another object of the present invention is to provide image processing method and device as well as an image processing program each allowing a proper adjustment of the hue and the saturation, and a medium for recording such a program.

Solution to Problems

In order to achieve the above objects, the present invention provides in its first aspect an image processing method adapted to convert grayscale characteristics of image data on an image, comprising: first grayscale conversion in which first grayscale characteristics conversion is performed using a first lookup table of one-dimensional type corresponding to RGB pixel data on the image; and second grayscale conversion in which the RGB pixel data on the image is converted into luminance data or lightness data and chromaticity data, and second grayscale characteristics conversion is performed only on the luminance data or lightness data using a second lookup table of one-dimensional type corresponding to the luminance data or lightness data, wherein weighting is performed with respect to the first grayscale characteristics conversion and the second grayscale characteristics conversion.

Also in order to achieve the above objects, the present invention provides in its second aspect an image processing device adapted to convert grayscale characteristics of image data on an image, comprising: a first grayscale conversion means for performing first grayscale characteristics conversion using a first lookup table of one-dimensional type corresponding to RGB pixel data on the image; and a second grayscale conversion means for converting the RGB pixel data on the image into luminance data or lightness data and chromaticity data, and performing second grayscale characteristics conversion only on the luminance data or lightness data using a second lookup table of one-dimensional type corresponding to the luminance data or lightness data, wherein the device performs weighting with respect to the first grayscale characteristics conversion and the second grayscale characteristics conversion.

The present invention provides in its third aspect an image processing program for making a computer implement individual steps of the image processing method of the first aspect.

The present invention provides in its fourth aspect a computer-readable recording medium in which an image processing program for making a computer implement individual steps of the image processing method of the first aspect is stored.

In each of the above aspects, the luminance data or lightness data is preferably Y on CIE XYZ colorimetric system or a value determined from the Y.

The chromaticity data is preferably a value determined from Cr and Cb on YCC color system or from X, Y and Z on XYZ colorimetric system.

It is preferable that the first grayscale conversion is carried out such that: it precedes the second grayscale conversion; and the first grayscale characteristics conversion is performed on first RGB pixel data on an input image so as to obtain second RGB pixel data, and the second grayscale conversion is carried out such that: the obtained second RGB pixel data is converted into first luminance data or lightness data and the chromaticity data; the second grayscale characteristics conversion is performed only on the first luminance data or lightness data so as to obtain second luminance data or lightness data; and the obtained second luminance data or lightness data and the chromaticity data are converted together into third RGB pixel data on an output image.

Preferably, during the second grayscale conversion, the second luminance data or lightness data and the chromaticity data are converted together into fourth RGB pixel data, and the third RGB pixel data on the output image is obtained by performing balance adjustment on the fourth RGB pixel data.

It is also preferable that the second grayscale conversion is carried out prior to the first grayscale conversion such that: first RGB pixel data on an input image is converted into third luminance data or lightness data and the chromaticity data; the second grayscale characteristics conversion is performed only on the third luminance data or lightness data so as to obtain fourth luminance data or lightness data; and the obtained fourth luminance data or lightness data and the chromaticity data are converted together into fifth RGB pixel data, and the first grayscale conversion is carried out such that the first grayscale characteristics conversion is performed on the obtained fifth RGB pixel data so as to obtain third RGB pixel data on an output image.

It is preferable that the weighting with respect to the first grayscale characteristics conversion (grayscale conversion) and the second grayscale conversion is performed by using images of a color chart that have different luminosities to determine a ratio between amounts of the first grayscale characteristics conversion and of the second grayscale characteristics conversion.

The ratio between the amounts of the first grayscale characteristics conversion and of the second grayscale characteristics conversion is preferably determined by processing the images that have different luminosities while varying the ratio between the amounts of the first grayscale characteristics conversion and of the second grayscale characteristics conversion, and calculating a*b* chromaticity on CIE L*a*b* color space to confirm saturation.

The images that have different luminosities are preferably obtained by photographing the color chart with a camera at different exposures or at different luminosities of light with which the color chart is illuminated or by calculating, from an image of the color chart, another image to be obtained at a different luminosity.

In addition, the weighting with respect to the first grayscale conversion and the second grayscale conversion is preferably performed in order to attain the aimed or specified grayscale characteristics conversion and the aimed or specified saturation reproduction, or for the fine adjustment of grayscale characteristics conversion and/or saturation reproduction.

It is preferable that the weighting is performed in order to synthesize a conversion characteristic curve used for converting grayscale characteristics of the image data on an image, and the image data on an image is converted using the synthesized conversion characteristic curve.

It is also preferable that the weighting is performed in order to change a conversion curve used for converting a specified range of grayscale characteristics of the image data on an image.

Advantageous Effects of Invention

According to the present invention, grayscale conversion realizing a favorable saturation reproduction is performed when images are exchanged to reproduction between color spaces or devices with different dynamic ranges.

The present invention makes it possible to suppress adverse effects of the change in saturation during the grayscale conversion of a color image, and exert control so that the saturation may favorably be reproduced even with a converted grayscale. In other words, according to the present invention, the saturation and the hue of a color are maintained, or the saturation is controlled at will, even though the gray level is changed.

According to the present invention, it is further possible to maintain the hue and the saturation in the color space which is non-linear to the luminance, that is to say, more adequate to human perception. Consequently, grayscale characteristics are attainable with accurately maintained hue and saturation even if dynamic range compression is performed between color spaces having quite different dynamic ranges.

Finally, according to the present invention, it is possible to design the degree of hue and saturation adjustment as appropriate.

BRIEF DESCRIPTION OF DRAWINGS

FIG. 1 is a block diagram illustrating a general configuration of an embodiment of the image processing device of the present invention.

FIGS. 2A and 2B are diagrams each showing the flow of an embodiment of the image processing method of the present invention.

DESCRIPTION OF EMBODIMENTS

Figure 3:
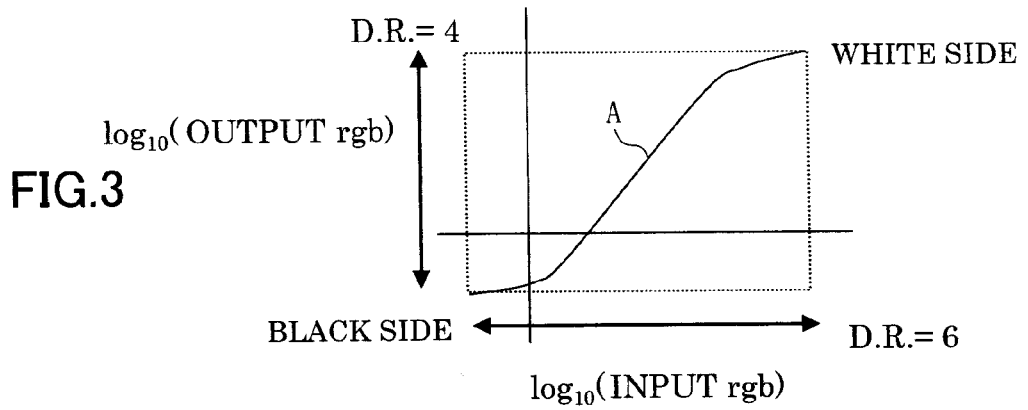
FIG. 3 is a graph showing an example of the grayscale conversion curve to be used in the present invention.

In the following, the image processing method and device, as well as the image processing program and the medium for recording the program, all according to the present invention, are described in detail based on the preferred embodiments as shown in the accompanying drawings.

FIG. 1 is a schematic block diagram illustrating a general configuration of an embodiment of the image processing device of the present invention for implementing the image processing method of the present invention. FIGS. 2A and 2B are flow charts each showing the flow of an embodiment of the image processing method of the invention implemented by the image processing device as shown in FIG. 1.

An image processing device 10 of the embodiment as shown in FIG. 1 includes an input image data acquiring unit 12 for acquiring RGB image data on an input image; a first grayscale conversion section 14 for subjecting the RGB image data to a specified grayscale conversion amount (compression/expansion amount) of first grayscale characteristics conversion process so as to obtain converted RGB image data; a second grayscale conversion section 22 provided with a colorimetric conversion unit 16 for colorimetrically converting RGB image data into luminance data (Y) or lightness data (L*) and chromaticity data (xy, CC or a*b*), a luminance grayscale conversion unit 18 for subjecting the luminance data or lightness data (Y or L*) to a specified grayscale conversion amount (compression/expansion amount) of second grayscale characteristics conversion process, and with an inverse conversion unit 20 for inversely converting the grayscale-converted luminance data (Y or L*) and the non-converted chromaticity data (xy, CC or a*b*) as subjected to no conversion together into RGB image data; an RGB balance adjustment unit 24 for performing RGB balance adjustment on the RGB image data so as to obtain RGB image data on an output image; an output image data outputting unit 26 for outputting the RGB image data on an output image to an external, image output device not shown; and a memory 28 in which the ratio between the grayscale conversion amounts for the first grayscale conversion section 14 and for the luminance grayscale conversion unit 18 of the second grayscale conversion section 22, as well as LUTs used in the first grayscale conversion section 14, the luminance grayscale conversion unit 18, and the RGB balance adjustment unit 24 are stored.

It is assumed in the present invention that image data (RGB, XYZ, YCC or L*a*b*), luminance data (Y), lightness data (L*), and chromaticity data (xy, CC or a*b*) refer to data on each pixel of an image, namely, the image data, luminance data, lightness data and chromaticity data on each pixel, respectively, as long as the data are involved with the image.

In the image processing device 10 of this embodiment, the first grayscale characteristics conversion process (hereafter referred to as "grayscale conversion process") in the first grayscale conversion section 14 may be performed before the second grayscale conversion process in the second grayscale conversion section 22 as shown in FIG. 1 with solid lines and in FIG. 2A as well, or after the second grayscale conversion process in the second grayscale conversion section 22 as shown in FIG. 1 with dotted lines and in FIG. 2B.

The image processing method of the first embodiment of the present invention as shown in FIGS. 1 and 2A, in which the first grayscale conversion process is followed by the second grayscale conversion process, is initially described.

In the image processing method of the first embodiment that is implemented by the image processing device 10 as shown, a target grayscale or a specified grayscale, or the total grayscale conversion amount considered as the target grayscale or the specified grayscale, the ratio between a first grayscale conversion amount (compression/expansion amount) and a second grayscale conversion amount, a first LUT (RGB-LUT) 14a used for the first grayscale conversion process (RGB grayscale conversion process) and a second LUT (luminance LUT) 18a used for the second grayscale conversion process (luminance grayscale conversion process), both prepared in accordance with the ratio as above, a third LUT (RGB balance adjustment LUT) 24a used for the RGB balance adjustment, and the like are stored in advance in the memory 28 as initial values or set points, as seen from FIGS. 1 and 2A. The first, second and third LUTs 14a, 18a and 24a are set in the first grayscale conversion section 14, the luminance grayscale conversion unit 18 and the RGB balance adjustment unit 24, respectively, during preprocessing (step S10).

The first and second LUTs 14a and 18a are obtained by distributing the grayscale conversion amount (grayscale compression/expansion amount) as the ultimate target or as specified between the grayscale conversion amounts of the RGB grayscale conversion and of the luminance grayscale conversion (Y or L*) at a certain ratio. The ratio between the grayscale conversion amounts may be made variable. The method of determining the grayscale conversion amount distribution ratio will be described later.

The following description is made on the typical case where the target grayscale is set in the memory 28 as an initial value or set point, although the present invention is not particularly limited to such setting, and a specified grayscale or even an arbitrary grayscale may be set as above. In addition, it is needless to say that the present invention is also applicable to such a case where fine adjustment in grayscale is to be conducted with no special settings, or conversion of grayscale characteristics and/or fine adjustment of the saturation reproduction is aimed.

When the grayscale conversion as the image processing of the present invention is started, the RGB image data which is RGB pixel data on an input image (hereafter referred to as "first RGB image data") is firstly acquired by the input image data acquiring unit 12 in step S12 of FIG. 2A.

Secondly in step S14, the acquired first RGB image data is subjected to a preset grayscale conversion amount of first grayscale conversion process by the first grayscale conversion section 14 using the first LUT (RGB-LUT) 14a as a one-dimensional LUT corresponding to the RGB pixel data, so as to generate the second RGB image data as grayscale-converted with the RGB pixel data. In other words, the first grayscale conversion section 14 is adapted to perform grayscale conversion in the RGB space as the first grayscale conversion process.

In the next step S16, the generated second RGB image data is colorimetrically converted (subjected to luminance and chromaticity conversion) by the colorimetric conversion unit 16 of the second grayscale conversion section 22 so as to generate luminance data (Y) and chromaticity data (xy, CC (Cr, Cb)) on CIE XYZ colorimetric system or YCC color system in NSTC mode, or lightness data (L*) and chromaticity data (a*b*) on CIE L*a*b* colorimetric system.

In the next step S18, the luminance data or lightness data (hereafter collectively referred to as "luminance data") (Y or L*) thus generated is subjected to a preset grayscale conversion amount of second grayscale conversion process by the luminance grayscale conversion unit 18 of the second grayscale conversion section 22 using the second LUT (luminance LUT) 18a as a one-dimensional LUT, so as to generate the second luminance data (Y or L*) as grayscale-converted. In other words, the luminance grayscale conversion unit 18 is adapted to perform grayscale conversion in the luminance-color difference area as the second grayscale conversion process.

It should be noted that the chromaticity data (xy, CC or a*b*) is not converted by the luminance grayscale conversion unit 18 and, accordingly, passes by the luminance grayscale conversion unit 18 in step S20 as the non-converted chromaticity data (CC or a*b*) as subjected to no conversion.

In the next step S22, the grayscale-converted second luminance data (Y or L*) and the non-converted chromaticity data (CC or a*b*) as subjected to no conversion are inversely converted by the inverse conversion unit 20 of the second grayscale conversion section 22 so as to generate RGB image data (hereafter referred to as "fourth RGB image data").

In the next step S24, the fourth RGB image data as generated by inverse conversion is subjected to RGB balance adjustment by the RGB balance adjustment unit 24 using the third LUT (RGB balance adjustment LUT) 24a as a one-dimensional LUT corresponding to the RGB pixel data, so as to generate RGB image data on an output image (hereafter referred to as "third RGB image data").

Finally in step S26, the generated third RGB image data is outputted as an output image from the output image data outputting unit 26 to an external, image output device not shown, such as printing devices including printers and displaying devices including monitors and display units.

The output image thus obtained is the image with a desirable color reproduction in which the grayscale of the input image has been converted (compressed/expanded) into the target grayscale while the hue and the saturation are favorably maintained.

The image processing method of another embodiment, namely, the second embodiment of the present invention as shown in FIGS. 1 and 2B, in which the second grayscale conversion process is followed by the first grayscale conversion process, is as described below.

Initially in step S30 of FIG. 2B, a preprocessing step similar to step S10 of FIG. 2A, the first, second and third LUTs 14a, 18a and 24a are set in the first grayscale conversion section 14, the luminance grayscale conversion unit 18 and the RGB balance adjustment unit 24, respectively.

When the grayscale conversion as the image processing of the present invention is started, the first RGB image data on an input image is firstly acquired by the input image data acquiring unit 12 in step S32 of FIG. 2B, as in step S12 of FIG. 2A.

Secondly in step S34, the first RGB image data is colorimetrically converted (subjected to luminance and chromaticity conversion) by the colorimetric conversion unit 16 of the second grayscale conversion section 22 so as to generate third luminance data (Y or L*) and chromaticity data (xy, CC or a*b*).

In the next step S36, the third luminance data (Y or L*) is subjected to the second grayscale conversion process by the luminance grayscale conversion unit 18 of the second grayscale conversion section 22 using the second LUT (luminance LUT) 18a so as to generate the fourth luminance data (Y or L*) as grayscale-converted.

The chromaticity data (xy, CC or a*b*) passes by the luminance grayscale conversion unit 18 in step S38 as the non-converted chromaticity data (CC or a*b*) as subjected to no conversion.

In the next step S40, the fourth luminance data (Y or L*) and the non-converted chromaticity data (CC or a*b*) are inversely converted by the inverse conversion unit 20 of the second grayscale conversion section 22 so as to generate RGB image data (hereafter referred to as "fifth RGB image data").

In the next step S42, the fifth RGB image data is subjected to the first grayscale conversion process by the first grayscale conversion section 14 using the first LUT (RGB-LUT) 14a as a one-dimensional LUT corresponding to the RGB pixel data, so as to generate the third RGB image data on an output image that is grayscale-converted with the RGB pixel data.

Finally in step S44, the generated third RGB image data is outputted as an output image from the output image data outputting unit 26 to an external, image output device not shown.

The output image thus obtained is the image with a desirable color reproduction in which the grayscale of the input image has been converted (compressed/expanded) into the target grayscale while the hue and the saturation are favorably maintained, as is the case with the first embodiment.

In the embodiments as described above, amounts obtained by spectral dispersion of light into three channels of red, yellow, and blue are used as RGB data values of RGB image data (RGB pixel data), to which the present invention is not limited. Any amounts are available as long as they are obtained by spectral dispersion of light into linearly independent three channels, or values (such as γ exponents or logarithms) obtained by performing grayscale conversion on such amounts, XYZ data values on CIE XYZ colorimetric system, for instance, may be used. In other words, in the present invention, RGB values may be defined as amounts obtained by spectral dispersion of light into linearly independent three channels or values obtained by performing grayscale conversion on such amounts.

If XYZ image data is to be used as RGB image data, the colorimetric conversion in step S16 of the first embodiment as shown in FIG. 2A and step S34 of the second embodiment as shown in FIG. 2B is the conversion process in which Y as luminance data and xy as chromaticity data are calculated from the XYZ image data, and the inverse conversion in step S22 of the first embodiment as shown in FIG. 2A and step S40 of the second embodiment as shown in FIG. 2B is the conversion process in which the XYZ image data is calculated from the luminance data Y and the chromaticity data xy.

As described before, the first grayscale conversion section 14 is adapted to perform grayscale conversion in the RGB space as the first grayscale conversion process. Also described before is that the first grayscale conversion allows the change in gray level without pixel data loss. If performed alone, however, the first grayscale conversion will simultaneously cause the change in hue and saturation, so that lighter colors as well as darker colors are reduced in saturation during the compression of the grayscale, for instance, which will make the color of an input image appear differently upon output.

On the other hand, the luminance grayscale conversion unit 18 is adapted to perform grayscale conversion in the luminance-color difference area as the second grayscale conversion process, as described before. The second grayscale conversion also allows the change in gray level without pixel data loss. With the second grayscale conversion alone, however, the reproduced color will feel uncomfortable because the saturation is kept intact.

For this reason, in the present invention, the grayscale conversion amount as a target, the target compression amount for instance, is distributed between the first grayscale conversion amount of grayscale conversion in the RGB space and the second grayscale conversion amount of grayscale conversion in the luminance-color difference area so that the hue and the saturation may be kept unchanged, and the saturation in particular may not be so reduced as to cause uncomfortable feeling.

In other words, it is possible in both the above first and second embodiments of the image processing method of the invention to combine the first grayscale conversion (RGB compression/expansion) based on the RGB-LUT which is the first LUT 14a with the second grayscale conversion (luminance compression/expansion) based on the luminance LUT which is the second LUT 18a, and perform weighting with respect to the first and second grayscale conversions, so as to accomplish the grayscale conversion (compression/expansion) into the target grayscale and a favorable saturation reproduction in a compatible manner with each other. As a result, the color reproduction is desirably realized. In particular, a more desirable color reproduction can be realized by making the weighting for the first and second grayscale conversions variable.

The combination of the first and second grayscale conversions with each other and the weighting for them may be carried out so that the RGB compression/expansion and the luminance compression/expansion as synthesized together may correspond to the target grayscale. In the present invention, the RGB-LUT and the luminance LUT may freely be designed provided that the target grayscale is attained by the synthesis of grayscale conversions.

It is preferable in order to obtain an output image from an input image to select in advance one of the flow sequences of the image processing methods of the first and second embodiments as shown in FIGS. 2A and 2B, to which the present invention is not limited. The two flow sequences of the first and second embodiments may each be employed if the situation to which the relevant flow sequence is adequate is automatically detected.

The combination of the first and second grayscale conversions with each other and the weighting for them are preferably performed in accordance with a particular situation or aim, such as photographing, printing, film shooting, and displaying, or may be performed as required for such a situation or aim.

The image processing method of the first embodiment as shown in FIG. 2A is specifically described below in reference to the practical case where grayscale compression is performed on an input image (RGB image data).

It is assumed that the dynamic range (D.R.) of input has a luminance ratio of $\log_{10}$ (luminance range)=6, namely 1,000,000:1, and the output device has a luminance ratio of $\log_{10}$ (luminance range)=4, namely 10,000:1.

The D.R. should eventually be compressed from 6 to 4.

RGB values of image data are normally in the state where the luminance undergoes γ correction. It is preferable in that case to undo γ correction so as to convert the data into that in the region of luminance.

$$r = R^{(1/\gamma)}$$

$$g = G^{(1/\gamma)}$$

$$b = B^{(1/\gamma)}$$

FIG. 3 shows a grayscale conversion curve for the dynamic range compression from the input to the output. During grayscale conversion, it is normal to use so-called S curve characteristics having a slope of approximately one in the region of medium luminosities (or brightness), and reduced slopes toward the white and black sides, respectively. A feature of the characteristics is that they do not change the color reproduction in the region of medium luminosities.

The curve of grayscale conversion from the input to the output is preferably tuned while making evaluation using image data for gray (R=G=B).

In this regard, the curve as designed is referred to as "curve A."

In FIG. 3, the state of r=g=b is obtained by the output gray with respect to the input gray (r=g=b), so that three curves are depicted in one and the same manner. The output gray, however, may be in the state of r≠g≠b. In that case, three different curves may be produced for colors R, G and B, respectively.

Figure 4:
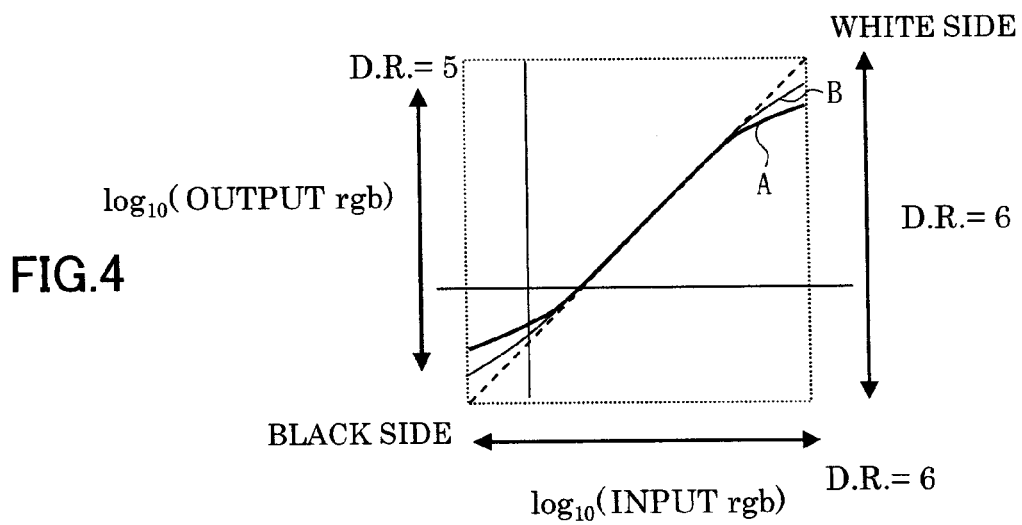
FIG. 4 is a graph provided in order to explain an example of the first grayscale characteristics conversion of the image processing method of the present invention.

The total compression amount of the grayscale compression as designed in the foregoing is distributed between the compression amounts in the RGB space and in the luminance-color difference area (space). The method of distributing the total compression amount and the shape of the grayscale curve may be selected at will as long as grayscale curve A as designed in the foregoing is attained when the two grayscale conversions are synthesized together. As a simple example, the method is described in which, as shown in FIG. 4, the ratio is linearly changed between a straight line with no compression having a slope of 45 degrees and represented with a dotted line and curve A of compressed grayscale that is eventually to be obtained. In the example as shown in FIG. 4, the grayscale compression whose amount is set at a half of the total grayscale compression amount is represented with a thin solid line.

This grayscale curve as adjusted to half compression is referred to as "curve B." As shown in FIG. 4, the dynamic range (DR) of input of curve B is DR=6, and its dynamic range (DR) of output is DR=5, an intermediate between the dynamic range (DR) of output of the straight line with a slope of 45 degrees as represented with a dotted line, 6, and the dynamic range (DR) of output of curve A, 4.

While the compression amount of curve B may be achieved in the RGB space or the luminance-color difference space, the description is made on the case where it is achieved in the RGB space.

With grayscale conversion in the RGB space being performed by the first conversion processing section 14 as shown in FIG. 1 in step S14 of FIG. 2A, an LUT (lookup table) in the shape of curve B is conveniently produced as the first LUT 14a, and the first LUT 14a thus obtained is applied to image data on an input image.

It is preferable to produce first LUTs in curve B shape for colors R, G and B, respectively, so as to perform processing for each color.

Next in step S16, the RGB signal (image data) as grayscale-converted in step S14 is converted by the colorimetric conversion unit 16 of the second conversion processing section 22 into a signal in the luminance-color difference space in order to perform the remaining compression in the luminance-color difference space.

Since the rgb values have already been made proportional to the luminance by undoing γ correction, they can be converted into CIE tristimulus values XYZ by matrix operation.

If the RGB signal is in the sRGB color space, the RGB signal is initially converted into an sRGB signal with the following equations.

If $R,G,B > 0.03928$ $RsRGB = R/12.92$ $GsRGB = G/12.92$ $BsRGB = B/12.92$

If $R,G,B > 0.03928$ $RsRGB = \{(R+0.055)/1.055\}^{2.4}$ $GsRGB = \{(G+0.055)/1.055\}^{2.4}$ $BsRGB = \{(B+0.055)/1.055\}^{2.4}$ [Mathematical Formula 1]

From the obtained sRGB signal, r=RsRGB, g=GsRGB, and b=BsRGB are found using the formula:

[Mathematical Formula 2]

$$\begin{bmatrix} X \\ Y \\ Z \end{bmatrix} = \begin{bmatrix} 0,412\ 4 & 0,357\ 6 & 0,180\ 5 \\ 0,212\ 6 & 0,715\ 2 & 0,072\ 2 \\ 0,019\ 3 & 0,119\ 2 & 0,950\ 5 \end{bmatrix} \begin{bmatrix} R_{sRGB} \\ G_{sRGB} \\ B_{sRGB} \end{bmatrix}$$

so as to calculate XYZ.

In the XYZ color space, the luminance is denoted by Y, and the chromaticity, namely x and y are calculated from:

$x = X/(X+Y+Z)$;

and $y = Y/(X+Y+Z)$.

When grayscale conversion in the region of luminance is performed in step S18, the luminance Y is converted by the luminance grayscale conversion unit 18 of the second conversion processing section 22, then X and Z are calculated anew so that neither x nor y may be changed.

In step S18, L*a*b* may be used as a more uniform color space in order to suppress the change in chromaticity more accurately. In that case, conversion from the XYZ colorimetric system into the L*a*b* colorimetric system is carried out as follows.

[Mathematical Formula 3]

$L^* = 116 \times f(Y/Yn) - 16$ $a^* = 500 \times [f(X/Xn) - f(Y/Yn)]$ $b^* = 200 \times [f(Y/Yn) - f(Z/Zn)]$ $f(t) = \begin{cases} t^{1/3} & : t > (6/29)^3 \\ 1/3 \times (29/6)^2 + 4/29 & : t \text{ being other than the above} \end{cases}$ In the equations, Xn, Yn, and Zn are normalizing values, for which XYZ values of white are used.

In the case of the L*a*b* space, control may be exerted such that L* is compressed and, at the same time, a* and b* are free of change. In other words, with the value of Y being changed in accordance with L*, X and Z may be calculated anew so as to prevent both a* and b* from being changed.

The curve of grayscale conversion based on the luminance may be obtained as follows.

The output RGB of each of grayscale curves A and B is converted into that in the L*a*b* space.

Figure 5:
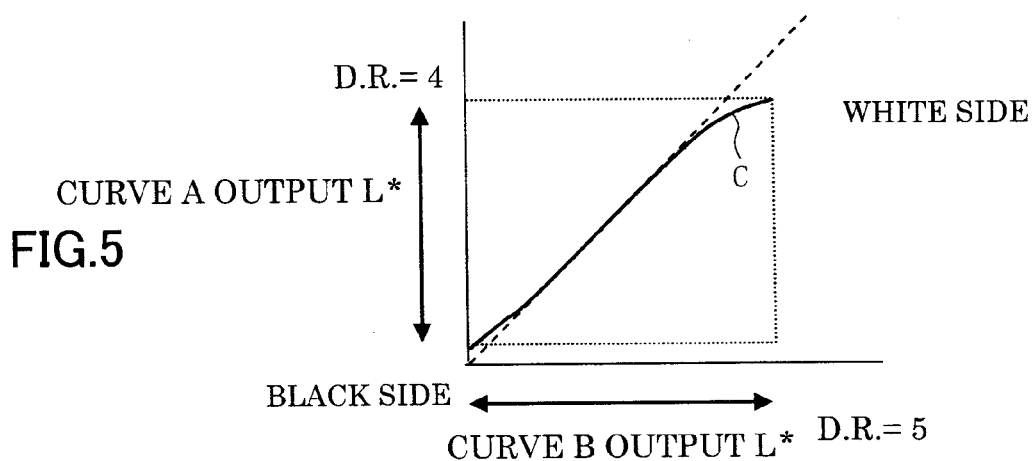
FIG. 5 is a graph for explaining an example of the second grayscale characteristics conversion of the image processing method of the present invention.

FIG. 5 is a graph showing the relationship between L*s for the two curves.

As shown in FIG. 5, the relationship is represented by one curve, and the curve in itself serves as an LUT used to compress L*. The curve is referred to as "curve C."

As shown in FIG. 5, the dynamic range (DR) of input of curve C (output L* for curve B) is the dynamic range (DR) of output of curve B, namely DR=5, while the dynamic range (DR) of output is the dynamic range (DR) of output of curve A, namely DR=4.

By synthesizing FIG. 4 as above and FIG. 5 together, the curve is obtained of which the dynamic range (DR) of input is 6 and the dynamic range (DR) of output is 4, the same dynamic ranges (DRs) of input and output as those of curve A which are 6 and 4, respectively.

In the next step S22, the luminance signal (luminance data) as grayscale-converted in step S18 and the non-converted chromaticity signal are inversely converted by the inverse conversion unit 20 of the second conversion processing section 22 into a signal in the RGB space.

Finally in step S24, the RGB signal (image data) as obtained in step S22 by inverse conversion is adjusted in RGB balance by the RGB balance adjustment unit 24.

In other words, the output is finely adjusted in RGB value balance to thereby make it consistent with the input gray.

To be more specific: Gray data showing r=g=b is inputted to curve B which is produced as above, then the output value is converted in the L*a*b* and L* is processed with curve C. Y is obtained from L* as processed, and X and Z are obtained so that neither a* nor b* may be changed. X, Y and Z as obtained are converted into R, G and B.

Figure 6A:
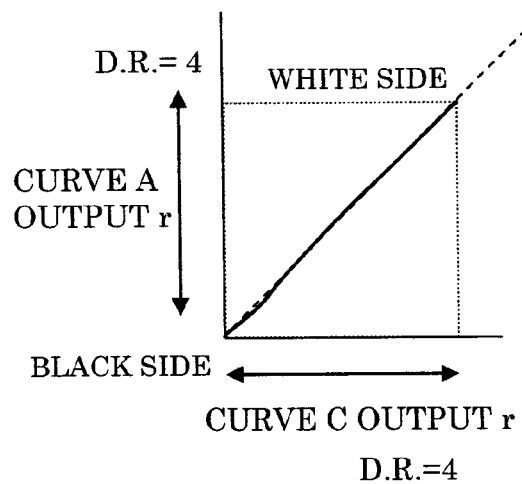
FIGS. 6A, 6B, and 6C are graphs for explaining an example of RGB balance adjustment by the image processing method of the present invention, made for the colors R, G and B, respectively.
Figure 6B:
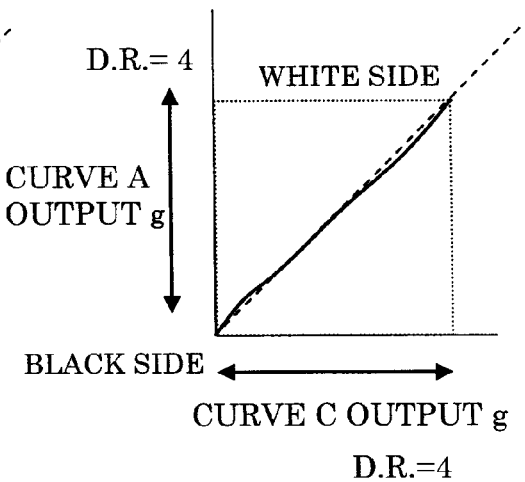
Figure 6C:
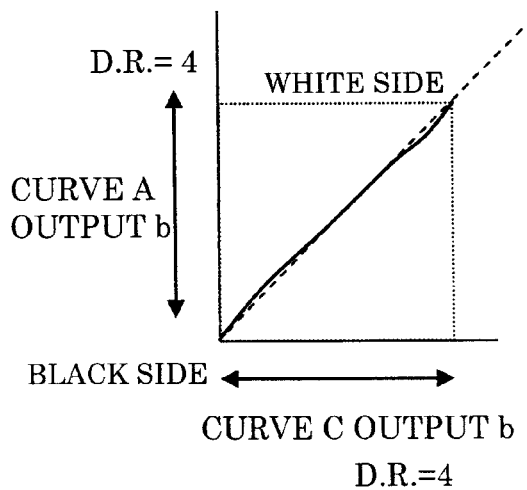

FIGS. 6A, 6B, and 6C are graphs showing R, G and B as obtained by following the above procedure on the x-axes, and R, G and B outputted when the gray of r=g=b is inputted to curve A on the y-axes, respectively.

FIGS. 6A, 6B, and 6C are of such features that they convert the output of curve C into the output of curve A for colors R, G and B, respectively. Consequently, they serve as the LUTs for colors R, G and B, respectively, that are used for finely adjusting the output in RGB value balance to thereby make it consistent with the input.

While the above description is made on the flow of the processing of the first embodiment as shown in FIG. 2A, in which the RGB compression is followed by the compression based on the luminance, it is also possible that, contrary to the above flow, the compression based on the luminance is followed by the compression based on RGB, as in the second embodiment shown in FIG. 2B.

In that case, an LUT used for the final RGB balance adjustment by the RGB balance adjustment unit 24 is unnecessary.

The conversion from RGB into the luminance and the color difference that is performed by the colorimetric conversion unit 16 is not limited to the conversion into Y and xy, or into L*a*b*. NTSC signals YCC may also be used.

YCC may be obtained from the equations below.

Luminance: $Y=0.3R+0.59G+11B$

Color difference 1: $Cr=R-Y$

Color difference 2: $Cb=B-Y$

As described before, in the present invention, the grayscale conversion amount as a target, the target compression amount for instance, is distributed between the first grayscale conversion amount of grayscale conversion in the RGB space and the second grayscale conversion amount of grayscale conversion in the luminance-color difference area so that the hue and the saturation may be kept unchanged, and the saturation in particular may not be so reduced as to cause uncomfortable feeling.

The ratio at which the total grayscale conversion amount is distributed between the first and second grayscale conversion amounts may arbitrarily be determined as long as the hue and the saturation are kept unchanged, and the saturation in particular is not so reduced as to cause uncomfortable feeling. As an example, the ratio is determined as follows.

Figure 7A:
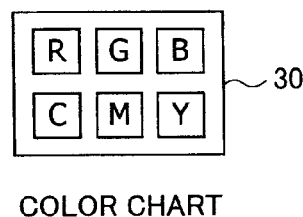
FIG. 7A is a diagram showing a color chart used in the image processing method of the present invention to determine the ratio between the amounts of the first grayscale characteristics conversion and of the second grayscale characteristic conversion.

In this example, such a color chart as a color chart 30 shown in FIG. 7A, which contains six square color patches in colors R, G, B, C, M, and Y, is used. Color chart images with different luminosities are used to determine the ratio between the compression in the RGB space and the compression in the luminance-color difference space.

The color chart images with different luminosities are obtained by:

1. photographing the color chart 30 with a camera at different exposures;
2. photographing the color chart 30 at different luminosities of the light with which the color chart is illuminated; or
3. calculating, from an image of the color chart, another image to be obtained at a different luminosity.

The color chart images thus obtained are processed with the initial value of the compression ratio, and the a*-b* chromaticity in the L*a*b* space is calculated to confirm the saturation. The procedure is repeated to adjust the ratio between the compression based on RGB and the luminance compression, so as to make the saturation appropriate in value.

Figure 7B:
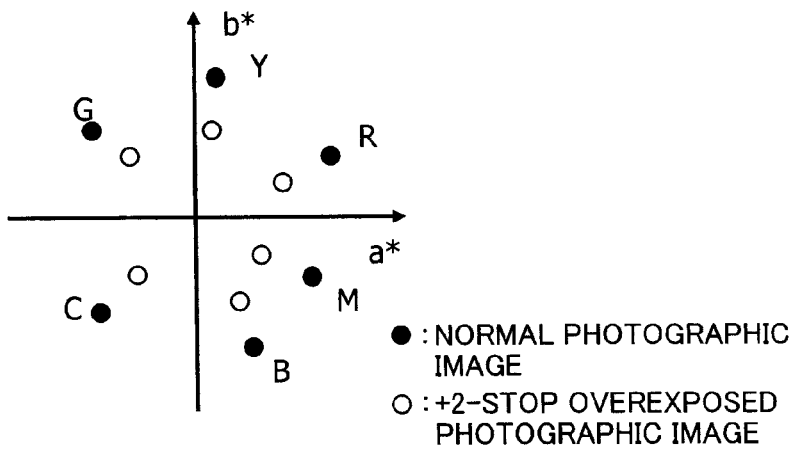
FIG. 7B is a graph of the chromaticity of color chart images with different luminosities.
Figure 7C:
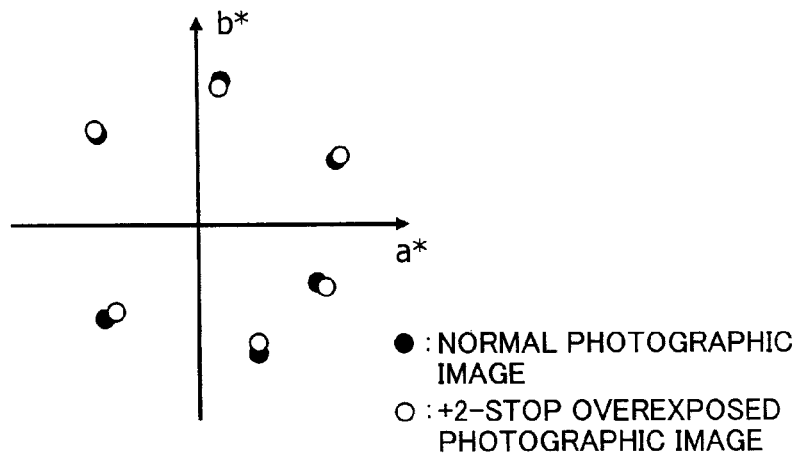
FIG. 7C is a graph of the chromaticity of the color chart image having undergone grayscale conversion.

For instance, the color patches of the color chart 30 in six colors R, G, B, C, M, and Y are photographed at a standard exposure to obtain normal photographic images of the six color patches, and the images are plotted on the chromaticity coordinates (chromaticity graph) as shown in FIG. 7B with black circlets. On the other hand, the color patches of the color chart 30 in six colors R, G, B, C, M, and Y are photographed at two-stop overexposure relative to the normal exposure to obtain two-stop overexposed photographic images of the six color patches, with the images being plotted on the chromaticity coordinate system as shown in FIG. 7B with white circlets.

As shown in FIG. 7B, each of the two-stop overexposed photographic images of the color patches of the color chart 30 in six colors R, G, B, C, M, and Y is deviated from the corresponding normal photographic image toward the origin on the chromaticity coordinates, which indicates the reduction in saturation.

Assuming that the difference in luminosity between the two-stop overexposed photographic images as such and the normal photographic images corresponds to the total grayscale conversion amount, the total grayscale compression amount for instance, the image processing method of the present invention is performed with different ratios between the compression based on RGB and the luminance compression so as to obtain RGB image data on output images of the color patches in six colors and plot the data on the chromaticity coordinate system of FIG. 7B, to thereby find the ratio which allows an essential coincidence between the points at which the normal photographic images of the color patches in six colors are plotted, and those at which the two-stop overexposed photographic images are plotted, namely a maintained saturation.

In this way, the ratio at which the total grayscale compression amount is distributed between the compression based on RGB and the luminance compression can be determined so that the saturation may not be reduced.

In the above example, the difference in luminosity between the two-stop overexposed photographic images and the normal photographic images, namely the initial state of saturation adjustment is assumed as the total grayscale conversion amount, to which the present invention is not limited. As a matter of course, the initial state of saturation adjustment may not be the total grayscale compression amount, and the proportion (ratio) between the RGB grayscale conversion (compression based on RGB) and the luminance grayscale conversion (luminance compression) may be of any value.

In the image processing methods of the first and second embodiments as shown in FIGS. 2A and 2B, respectively, the first grayscale conversion (RGB grayscale conversion) and the second grayscale conversion (luminance grayscale conversion) are carried out such that one of them is performed on an input image prior to the other, to which the present invention is not limited. The two conversions may be performed in parallel with each other as parallel processing, followed by weighted addition between the two converted values.

Figure 8:
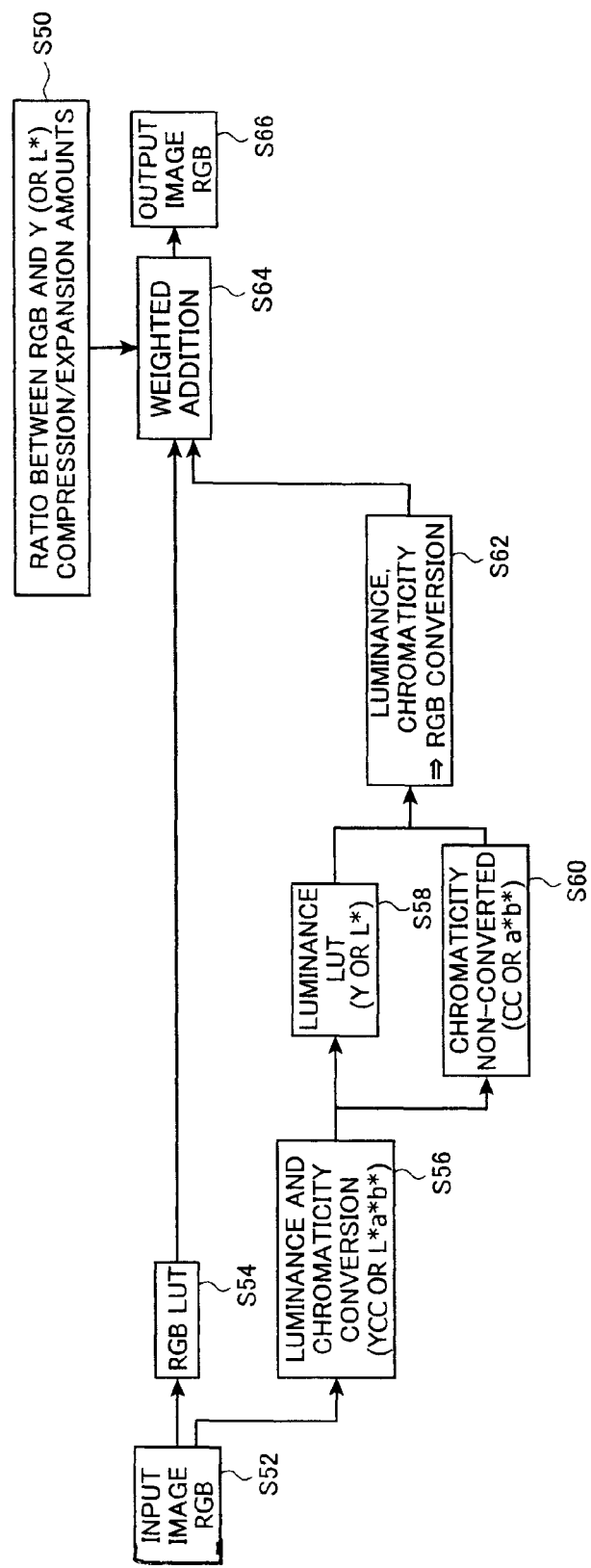
FIG. 8 is a diagram showing the flow of another embodiment of the image processing method of the present invention.

In FIG. 8, the flow of such an image processing method according to a third embodiment of the present invention is shown.

The image processing method of the third embodiment of the invention as shown in FIG. 8 is described below.

The image processing method of the third embodiment as shown in FIG. 8 includes steps similar to steps S12 and S14 as well as steps S32 through S40 and S44 of the image processing methods of the first and second embodiments as shown in FIGS. 2A and 2B, so that further description is not made on like processing in like steps, with different points being chiefly described. In this embodiment, the RGB balance adjustment unit 24 of FIG. 1 serves as a weighted addition unit.

Initially in step S50 of FIG. 8, a preprocessing step similar to step S10 of FIG. 2A, the first and second LUTs 14a and 18a are set in the first grayscale conversion section 14 and the luminance grayscale conversion unit 18, respectively. In this embodiment, however, the first and second LUTs 14a and 18a as stored in the memory 28 are not dependent on the ratio between the first and second grayscale conversion amounts, in contrast to step S10 of FIG. 2A.

In this embodiment, a weighting coefficient used for the weighted addition by the RGB balance adjustment unit 24 is stored in the memory 28. During preprocessing, the weighting coefficient is read out of the memory 28 and set in the RGB balance adjustment unit 24.

The weighting coefficient is selected in accordance with the ratio between the first and second grayscale conversion amounts, and used for the weighted addition between the image data which has been subjected to the first grayscale conversion process and the image data which has been subjected to the second grayscale conversion process.

When the grayscale conversion as the image processing of this embodiment is started, the first RGB image data on an input image is firstly acquired by the input image data acquiring unit 12 in step S52 of FIG. 8, as in step S12 of FIG. 2A and step S32 of FIG. 2B.

Secondly in step S54, the first RGB image data is subjected to the first grayscale conversion process by the first grayscale conversion section 14 using the first LUT 14a so as to generate second RGB image data, as in step S14 of FIG. 2A. The generated second RGB image data is transmitted from the first grayscale conversion section 14 to the RGB balance adjustment unit 24 as shown in FIG. 1 with two-dot chain lines, and subjected to weighted addition.

On the other hand, the second grayscale conversion process is performed in steps S56 through S62, in parallel with the first grayscale conversion process in step S54 in this embodiment.

Initially in step S56, a third luminance data (Y or L*) and chromaticity data (xy, CC or a*b*) are generated by the colorimetric conversion unit 16 of the second grayscale conversion section 22 from the first RGB image data, as in step S34 of FIG. 2B.

In the next step S58, the third luminance data (Y or L*) is subjected to the second grayscale conversion process by the luminance grayscale conversion unit 18 of the second grayscale conversion section 22 so as to generate fourth luminance data (Y or L*), as in step S36 of FIG. 2B.

The chromaticity data (xy, CC or a*b*) passes by the luminance grayscale conversion unit 18 in step S60, as in step S38 of FIG. 2B.

In the next step S62, fifth RGB image data is generated by the inverse conversion unit 20 of the second grayscale conversion section 22 from the fourth luminance data (Y or L*) and the non-converted chromaticity data (CC or a*b*), as in step S40 of FIG. 2B. The generated fifth RGB image data is transmitted from the second grayscale conversion section 22 to the RGB balance adjustment unit 24 as shown in FIG. 1, and subjected to weighted addition.

In the next step S64, the second RGB image data from step S54 (the first grayscale conversion section 14) and the fifth RGB image data from step S62 (the second grayscale conversion section 22) are subjected to weighted addition by the RGB balance adjustment unit 24 using the weighting coefficient as set in the RGB balance adjustment unit 24 in accordance with the ratio between the first and second grayscale conversion amounts, so as to generate third RGB image data on an output image.

Finally in step S66, the generated third RGB image data is outputted as an output image from the output image data outputting unit 26 to an external, image output device, as in step S26 of FIG. 2A and step S44 of FIG. 2B.

The output image thus obtained is the image with a desirable color reproduction in which the grayscale of the input image has been converted (compressed/expanded) into the target grayscale while the hue and the saturation are favorably maintained, as is the case with the first and second embodiments.

In the first through third embodiments as described above, the first grayscale conversion (RGB grayscale conversion) process and the second grayscale conversion (luminance grayscale conversion) process are each performed once, to which the present invention is not limited. It is also possible to perform either or both of the first and second grayscale conversion processes two or more times, and in any order.

Figure 9:
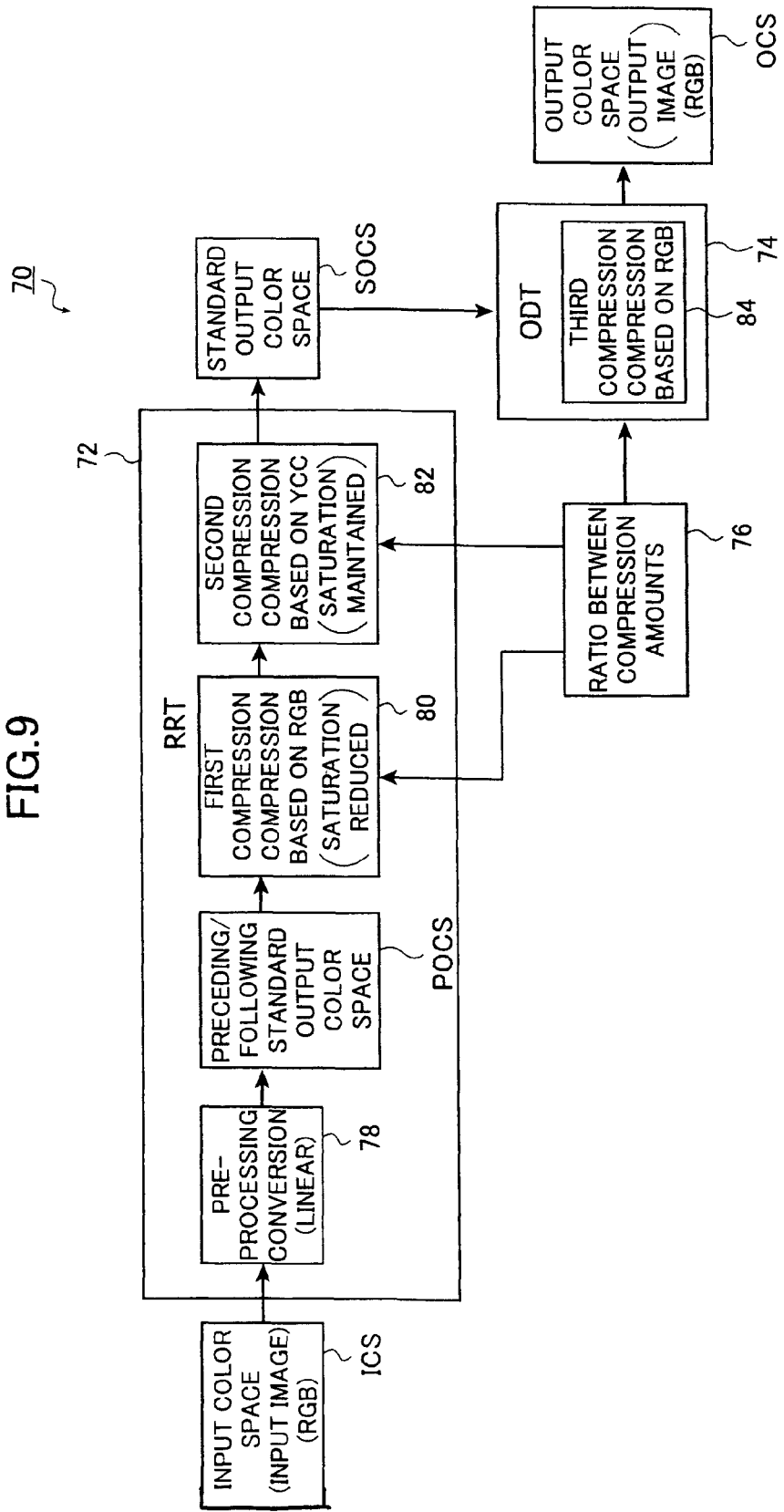
FIG. 9 is a diagram illustrating an image processing device for implementing yet another embodiment of the image processing method of the present invention.
Figure 10:
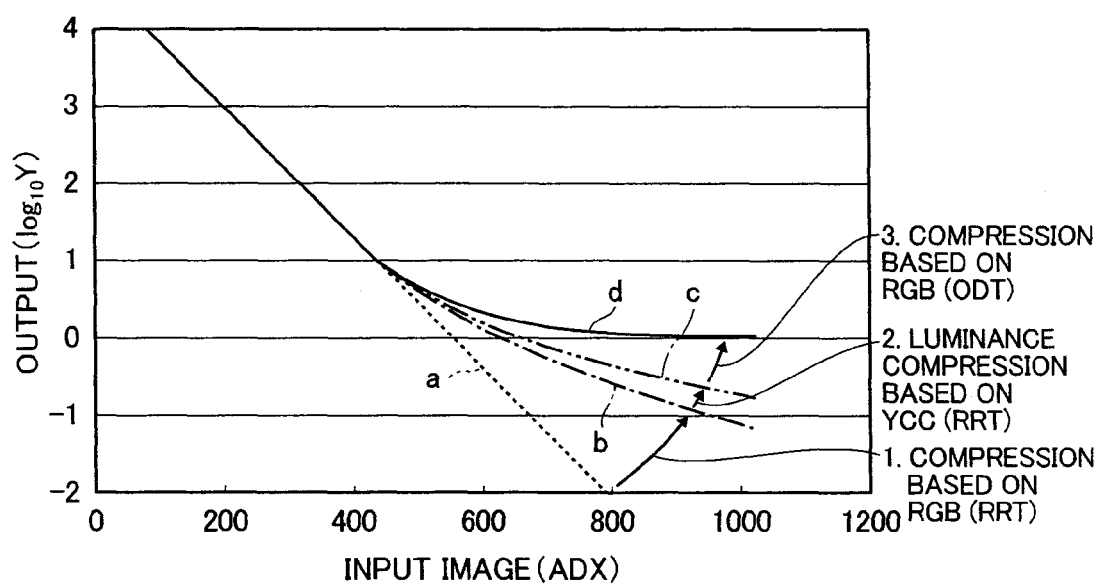
FIG. 10 is a graph showing exemplary curves of compressive conversion by individual conversion process units of the image processing device as shown in FIG. 9.
Figure 11:
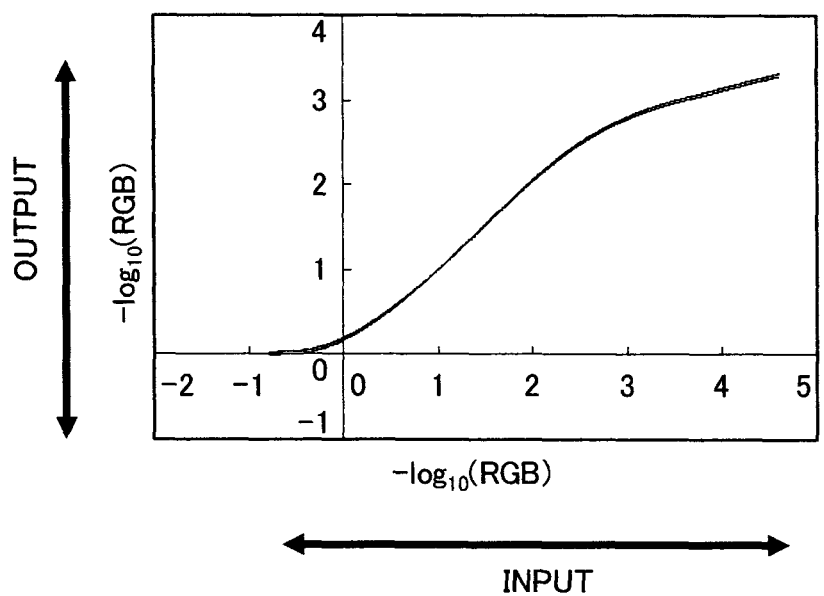
FIG. 11 is a graph showing a grayscale conversion curve.

FIG. 9 illustrates an image processing device for implementing such an image processing method according to a fourth embodiment of the present invention, while FIG. 10 is a graph showing exemplary curves of compressive conversion by individual conversion process units of the image processing device as shown in FIG. 9.

Individual conversion processes performed by the image processing device of the fourth embodiment of the invention as shown in FIGS. 9 and 10 are described.

An image processing device 70 shown in FIG. 9 is involved with the color space conversion from an input color space ICS for acquiring an input image (RGB image data) into an output color space OCS for outputting an output image (RGB image data), and includes a reference rendering transform (RRT) section 72 for performing conversion from the input color space ICS into a standard output color space SOCS, an output device transform (ODT) section 74 for performing conversion from the standard output color space SOCS into the output color space OCS, and a ratio setting unit 76 for setting the ratio of the amount of compression performed by each of compression units (80, 82 and 84) of the RRT section 72 and the ODT section 74 to the total grayscale compression amount.

The RRT section 72 has a preprocessing conversion unit 78 for performing linear transformation on the input color space ICS so as to obtain a preceding standard output color space POCS, a first compression unit 80 for subjecting the preceding standard output color space POCS to compression based on RGB, and a second compression unit 82 for subjecting the color space as compressed by the first compression unit 80 to luminance compression based on YCC so as to obtain the standard output color space SOCS.

On the other hand, the ODT section 74 has a third compression unit 84 for subjecting the standard output color space SOCS to second-stage compression based on RGB so as to obtain the output color space OCS which is device-dependent.

The conversion by the preprocessing conversion unit 78 applies to linear transformation represented by a compressive conversion curve, or rather line, a shown in FIG. 10 with a dotted line.

In the case as shown, the input image data includes data on very light areas with negative densities. Densities in the negative range cannot be reproduced by the output device, so that it is required of the image processing method of this embodiment to compress at least the portion of the compressive conversion curve (line) a that is in the negative density range smoothly so that the density may eventually be zero, while controlling the saturation as appropriate.

For this reason, in the present invention, compression is performed by the first, second, and third compression units in three steps.

The first-stage compressive conversion based on RGB which is performed by the first compression unit 80 is a process of conversion from the compressive conversion curve (line) a as shown in FIG. 10 with a dotted line into a compressive conversion curve b shown with a chain line. In the process, the portion of the compressive conversion curve (line) a that is in the negative density range is caused to approach a density of zero by raising the curve a in its part descending from the vicinity of a density ($\log_{10}Y$) of one smoothly and considerably while reducing the saturation.

The compressive conversion of the luminance based on YCC which is performed by the second compression unit 82 is a process of conversion from the compressive conversion curve b as shown in FIG. 10 with a chain line into a compressive conversion curve c shown with a two-dot chain line. In the process, the portion of the compressive conversion curve b that is in the negative density range is raised a little to cause it to further approach a density of zero while the saturation is maintained.

The first-stage compression based on RGB by the first compression unit 80 and the luminance compression based on YCC by the second compression unit 82 are performed as RRT processing by the RRT section 72.

The second-stage compressive conversion based on RGB which is performed by the third compression unit 84 is a process of conversion from the compressive conversion curve c as shown in FIG. 10 with a two-dot chain line into a compressive conversion curve d shown with a solid line. In the process, the portion of the compressive conversion curve c that is in the negative density range is raised so that the density may be zero or higher, that is to say, eventually be zero, while the saturation is so controlled as to be appropriate.

The second-stage compression based on RGB by the third compression unit 84 is performed as ODT processing by the ODT section 74.

The thus obtained compressive conversion curve d of an output image (output color space) corresponds to the image with a desirable color reproduction in which the grayscale of the input image has been converted (compressed) into the target grayscale while the hue and the saturation are favorably maintained.

In the case as shown, it is preferable that the first-stage compression based on RGB is followed by the luminance compression based on YCC because the control in saturation needs to be performed in the region of higher saturations and is, accordingly, hard to perform if the luminance compression based on YCC is initially performed. Thus in the case as shown, the luminance compression based on YCC is performed between the first-stage and second-stage compressions based on RGB, to which the present invention is not limited. The compression based on RGB and the luminance compression based on YCC may be determined in number of times and in order as appropriate to the color space of a scene in an input image and the color space as a reproduction target.

The ratio of the compression amount of each of the first-stage compression based on RGB by the first compression unit 80, the luminance compression based on YCC by the second compression unit 82, and the second-stage compression based on RGB by the third compression unit 84 to the total grayscale compression amount is set in advance by the ratio setting unit 76 in the relevant compression unit.

In the case as shown, it is preferable that the compression amount of the first-stage compression based on RGB is the largest and the compression amount of the following luminance compression based on YCC is the smallest, to which the present invention is not limited. The ratio between compression amounts of different compressions may be determined as appropriate to a scene in an input image and a reproduction target according thereto.

The image processing device 10 of the embodiment as shown in FIG. 1 as well as the image processing methods of the first and second embodiments as shown in FIGS. 2A and 2B, respectively, are each adapted to obtain an output image by subjecting an input image to the first grayscale conversion (RGB grayscale conversion) and the second grayscale conversion (luminance grayscale conversion) as weighted, to which the present invention is not limited. Although not shown, the weighting with respect to the first and second grayscale conversions may also be performed in order to synthesize a conversion characteristic curve used for subjecting image data on an image to grayscale conversion, and convert an input image into an output image using the synthesized conversion characteristic curve, or in order to change a conversion curve used for converting a specified range of grayscale characteristics of image data on an image.

In the embodiments as described above, during the second grayscale conversion, the luminance data or lightness data is subjected to luminance grayscale conversion while the chromaticity data is made to pass by, to which the present invention is not limited. It is also possible to change the chromaticity data.

If the chromaticity is to be changed, CC or a*b* may be changed in step 38 of FIG. 2B or step S60 of FIG. 8. Change is possible by using equations: $Cr'=Cr*k1$ and $Cb'=Cb*k2$ (k1 and k2 being coefficient parameters) for CC (Cr, Cb) for instance, or equations: $a^{*'}=a^{*}+k3$ and $b^{*'}=b^{*}+k4$ (k3 and k4 being coefficient parameters).

The methods of changing Cr and Cb, as well as a* and b* are not limited to the above, that is to say, other operation expressions or LUTs are also available.

The image processing methods as described above are able to be implemented on a computer by running an image processing program.

For instance, the image processing program of the present invention includes procedures for making a computer, specifically a CPU thereof, implement the individual steps of the image processing methods as above. The program consisting of such procedures may be constructed as one or more program modules.

The image processing program which consists of the procedures to be implemented by a computer may be stored in a memory (storage unit) of a computer or a server, or in a recording medium. Upon implementation, the program is read out of the memory or recording medium and implemented by the computer (CPU) of interest or other computer. Consequently, the present invention can provide the computer-readable memory or recording medium in which the image processing program for making a computer implement the image processing method of the above first embodiment is stored.

The present invention is fundamentally as described above. While the image processing method and device, as well as the image processing program and the medium for recording the program, all according to the present invention, have been detailed above, the present invention is in no way limited to the above embodiments. It is needless to say that various improvements or modifications are possible within the gist of the present invention.

LEGENDS

10 Image processing device
12 Input image data acquiring unit
14 First grayscale conversion section
16 Colorimetric conversion unit
18 Luminance grayscale conversion unit
20 Inverse conversion unit
22 Second grayscale conversion section
24 RGB balance adjustment unit
26 Output image data outputting unit
28 Memory

The invention claimed is:

1. An image processing method adapted to convert grayscale characteristics of image data of an image, comprising:
   first grayscale conversion which performs first grayscale characteristics conversion using a first lookup table of one-dimensional type corresponding to RGB pixel data of the image; and
   second grayscale conversion which converts the RGB pixel data of the image into luminance data or lightness data and chromaticity data, and performs second grayscale characteristics conversion on the thus converted luminance data or lightness data using a second lookup table of one-dimensional type corresponding to the luminance data or lightness data,
   wherein weighting to the first grayscale conversion and the second grayscale conversion is performed.

2. The image processing method according to claim 1, wherein said luminance data or lightness data is Y on CIE XYZ colorimetric system or a value determined from the Y.

3. The image processing method according to claim 1, wherein said chromaticity data is a value determined from Cr and Cb on YCC color system or from X, Y and Z on XYZ colorimetric system.

4. The image processing method according to claim 1, wherein said first grayscale conversion is carried out prior to said second grayscale conversion,
   wherein said first grayscale conversion performs said first grayscale characteristics conversion on first RGB pixel data on an input image to obtain second RGB pixel data, and
   wherein the second grayscale conversion
      converts the thus obtained second RGB pixel data into first luminance data or lightness data and said chromaticity data,
      performs said second grayscale characteristics conversion on the thus converted first luminance data or lightness data to obtain second luminance data or lightness data, and
      converts the thus obtained second luminance data or lightness data and the chromaticity data into third RGB pixel data of an output image.

5. The image processing method according to claim 4, wherein said second grayscale conversion
   converts said second luminance data or lightness data and said chromaticity data into fourth RGB pixel data, and
   performs balance adjustment on the thus converted fourth RGB pixel data to obtain said third RGB pixel data of said output image.

6. The image processing method according to claim 1, wherein said second grayscale conversion is carried out prior to said second grayscale conversion,
   wherein said second grayscale conversion
      converts first RGB pixel data of an input image into third luminance data or lightness data and said chromaticity data,
      performs said second grayscale characteristics conversion on the thus converted third luminance data or lightness data to obtain fourth luminance data or lightness data, and
      converts the thus obtained fourth luminance data or lightness data and the chromaticity data into fifth RGB pixel data, and
   wherein the first grayscale conversion performs said first grayscale characteristics conversion on the thus obtained fifth RGB pixel data to obtain third RGB pixel data of an output image.

7. The image processing method according to claim 1, wherein said first grayscale conversion is carried out in parallel with said second grayscale conversion,
   wherein said first grayscale conversion performs said first grayscale characteristics conversion on first RGB pixel data of an input image to obtain second RGB pixel data,
   wherein the second grayscale conversion
      converts the first RGB pixel data of the input image into third luminance data or lightness data and said chromaticity data,
      performs said second grayscale characteristics conversion on the thus converted third luminance data or lightness data to obtain fourth luminance data or lightness data, and
      converts the thus obtained fourth luminance data or lightness data and the chromaticity data into fifth RGB pixel data, and
   the weighting to the first grayscale conversion and the second grayscale conversion is carried out such that weighted addition is performed between the second RGB pixel data obtained by the first grayscale conversion and the fifth RGB pixel data obtained by the first grayscale conversion, so as to obtain third RGB pixel data of an output image.

8. The image processing method according to claim 1, wherein said weighting to said first grayscale conversion and said second grayscale conversion is performed by using images of a color chart that have different luminosities to determine a ratio between amounts of said first grayscale characteristics conversion and of said second grayscale characteristics conversion.

9. The image processing method according to claim 8, wherein the ratio between the amounts of said first grayscale characteristics conversion and of said second grayscale characteristics conversion is determined by processing said images that have different luminosities while varying the ratio between the amounts of the first grayscale characteristics conversion and of the second grayscale characteristics conversion, and calculating chromaticity on a color space to confirm saturation.

10. The image processing method according to claim 9, wherein said chromaticity on the color space is a*b* chromaticity on CIE L*a*b* color space.

11. The image processing method according to claim 8, wherein said images that have different luminosities are obtained by photographing said color chart with a camera at different exposures or at different luminosities of light with which the color chart is illuminated or by calculating, from an image of the color chart, another image to be obtained at a different luminosity.

12. A non-transitory computer-readable recording medium in which an image processing program for making a computer implement individual steps of the image processing method according to claim 1 is stored.

13. An image processing device adapted to convert grayscale characteristics of image data on an image, comprising:
   a first grayscale conversion unit which performs first grayscale characteristics conversion using a first lookup table of one-dimensional type corresponding to RGB pixel data of the image; and
   a second grayscale conversion unit which converts the RGB pixel data of the image into luminance data or lightness data and chromaticity data, and performing second grayscale characteristics conversion on the thus converted luminance data or lightness data using a second lookup table of one-dimensional type corresponding to the luminance data or lightness data,
   wherein weighting to the first grayscale characteristics conversion and the second grayscale characteristics conversion is performed.

* * * * *